(12) United States Patent
Nakamura et al.

(10) Patent No.: US 12,555,707 B2
(45) Date of Patent: Feb. 17, 2026

(54) THERMISTOR SINTERED BODY AND METHOD FOR MANUFACTURING THERMISTOR SINTERED BODY

(71) Applicant: SHIBAURA ELECTRONICS CO., LTD., Saitama (JP)

(72) Inventors: Kazumasa Nakamura, Saitama (JP); Noriyuki Nakayama, Saitama (JP); Ikuo Yanase, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 179 days.

(21) Appl. No.: 18/560,607

(22) PCT Filed: Nov. 11, 2021

(86) PCT No.: PCT/JP2021/041493
§ 371 (c)(1),
(2) Date: Nov. 13, 2023

(87) PCT Pub. No.: WO2023/084678
PCT Pub. Date: May 19, 2023

(65) Prior Publication Data
US 2024/0257999 A1    Aug. 1, 2024

(51) Int. Cl.
*H01C 7/04*        (2006.01)
*B28B 1/20*        (2006.01)
*H01C 17/00*       (2006.01)

(52) U.S. Cl.
CPC .............. *H01C 7/041* (2013.01); *B28B 1/20* (2013.01); *H01C 17/00* (2013.01)

(58) Field of Classification Search
CPC .. B28B 1/20; H01C 17/00; H01C 7/04; H01C 7/041; H01C 7/043; H01C 17/065
See application file for complete search history.

(56) References Cited

U.S. PATENT DOCUMENTS

2006/0130956 A1    6/2006    White et al.
2010/0259358 A1    10/2010   Ryu

FOREIGN PATENT DOCUMENTS

JP        S64-66926 A     3/1989
JP        S64-77101 A     3/1989
(Continued)

OTHER PUBLICATIONS

Feltz et al, WO 9322255 Nov. 1993.*
(Continued)

*Primary Examiner* — Lawrence D Ferguson
(74) *Attorney, Agent, or Firm* — McDonald Hopkins LLC

(57) ABSTRACT

A thermistor sintered body has a thickness in a range of 1 μm to 100 μm and an area in a range of 1 mm$^2$ to 10 mm$^2$, and is composed of a single body of a sintered body having a composition of $NiMn_2O_4$. This thermistor sintered body can be manufactured by a first step of dropping a raw material liquid RL onto a surface of a substrate rotatably supported, a second step of rotating the substrate with the dropped raw material liquid RL and spreading the raw material liquid RL, a third step of forming a sintered body having the composition of $NiMn_2O_4$ on the surface of the substrate by heating and holding the raw material liquid RL and the substrate on which the raw material liquid RL has been placed, and a fourth step of separating the sintered body from the substrate.

18 Claims, 18 Drawing Sheets

(56) References Cited

FOREIGN PATENT DOCUMENTS

| | | |
|---|---|---|
| JP | H04-247603 A | 9/1992 |
| JP | H06-263518 A | 9/1994 |
| JP | 2005-279953 A | 10/2005 |
| JP | 2006-179911 A | 7/2006 |
| JP | 5180987 B2 | 4/2013 |

OTHER PUBLICATIONS

International Search Report for PCT/JP2021/041493 dated Feb. 1, 2022.
Written Opinion for PCT/JP2021/041493 dated Feb. 1, 2022.

\* cited by examiner

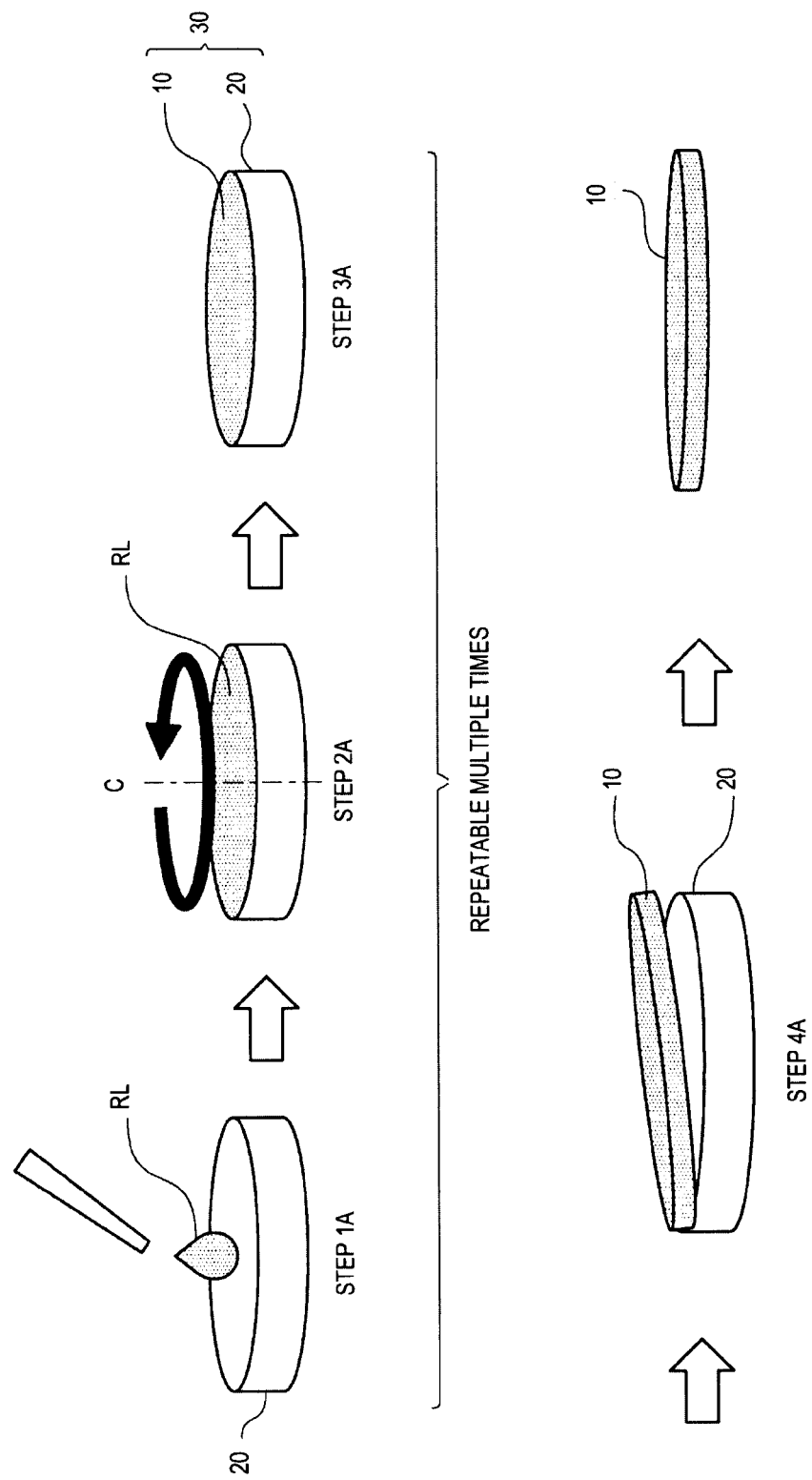

| Fe SUBSTITUTION RATIO (%) | SINTERED BODY DENSITY (g/cm$^3$) | THEORETICAL DENSITY (g/cm$^3$) | RELATIVE DENSITY (%) |
|---|---|---|---|
| 0 | 4.699 | 5.187 | 90.6 |
| 15 | 4.761 | 5.220 | 91.2 |
| 30 | 4.795 | 5.245 | 91.4 |
| 50 | 4.937 | 5.276 | 93.6 |
| 75 | 4.935 | 5.332 | 92.6 |
| 100 | 4.442 | 5.360 | 82.9 |

FIG. 12
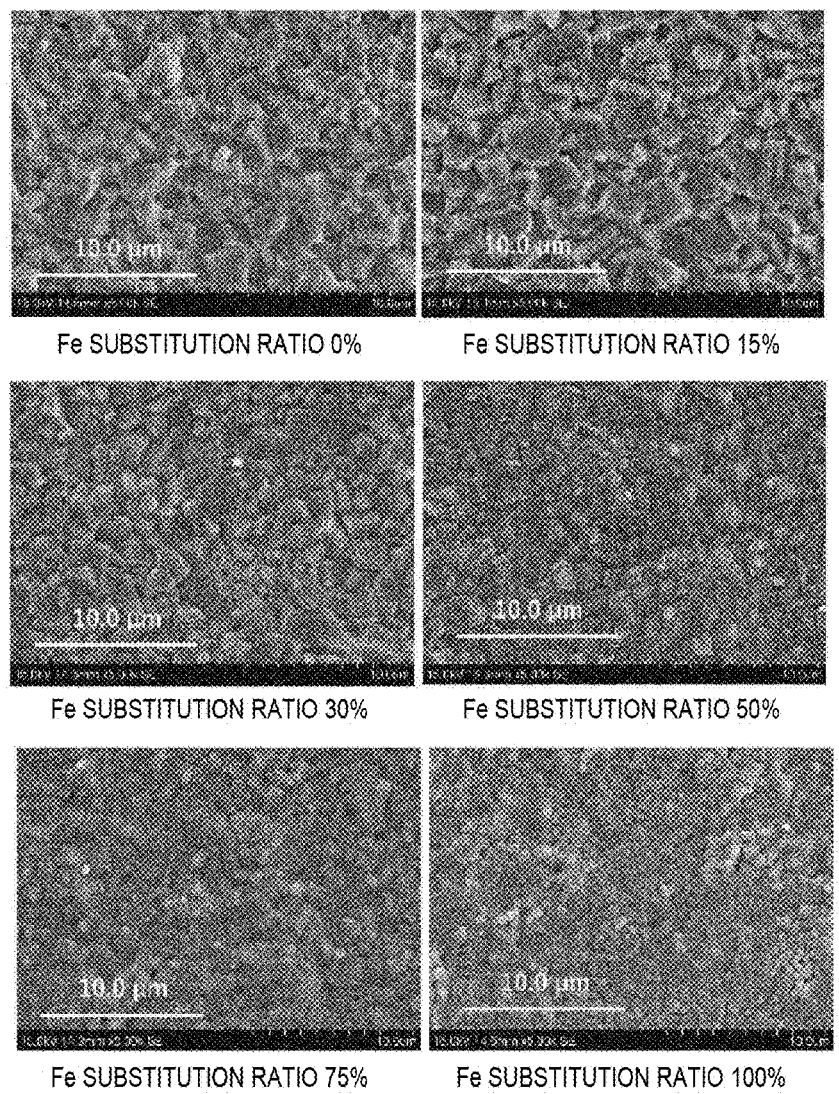
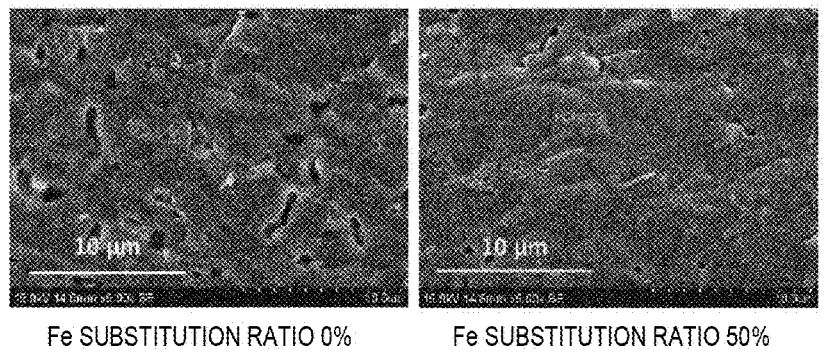

FIG. 14A

| Fe SUBSTITUTION RATIO | 0% | 15% | 30% | 50% | 75% | 100% |
|---|---|---|---|---|---|---|
| B CONSTANT (K) | 2457 | 2742 | 2324 | 2898 | 2440 | 2547 |

FIG. 14B

| Fe SUBSTITUTION RATIO | 0% | 15% | 30% | 50% | 75% | 100% |
|---|---|---|---|---|---|---|
| ROOM TEMPERATURE RESISTANCE VALUE | 54.0 KΩ | 42.3 KΩ | 39.5 KΩ | 17.2 KΩ | 52.2 KΩ | 80.7 KΩ |
| RESPONSE TIME | 15.8s | 16.1s | 16s | 10.1s | 17.8s | 23.8s |

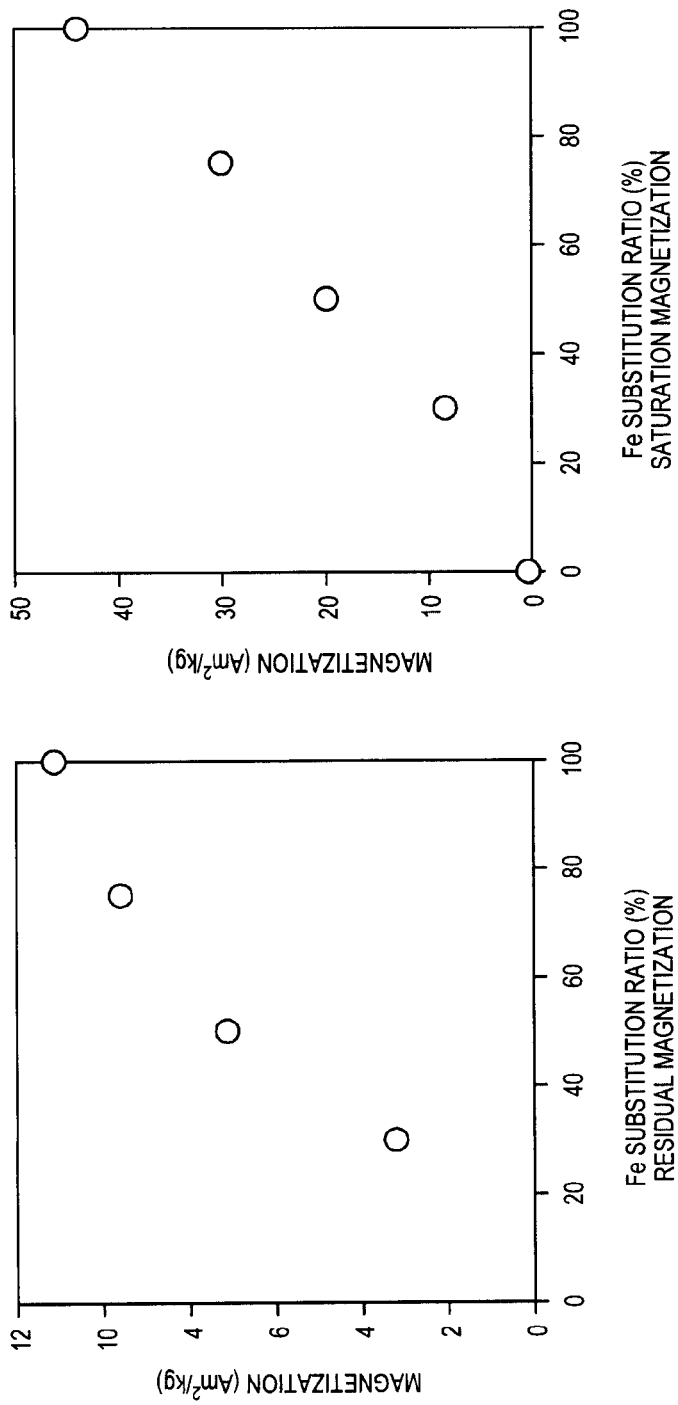

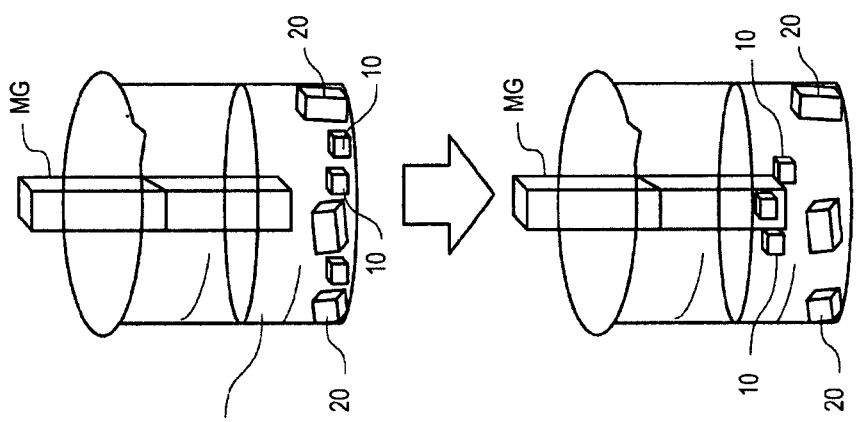
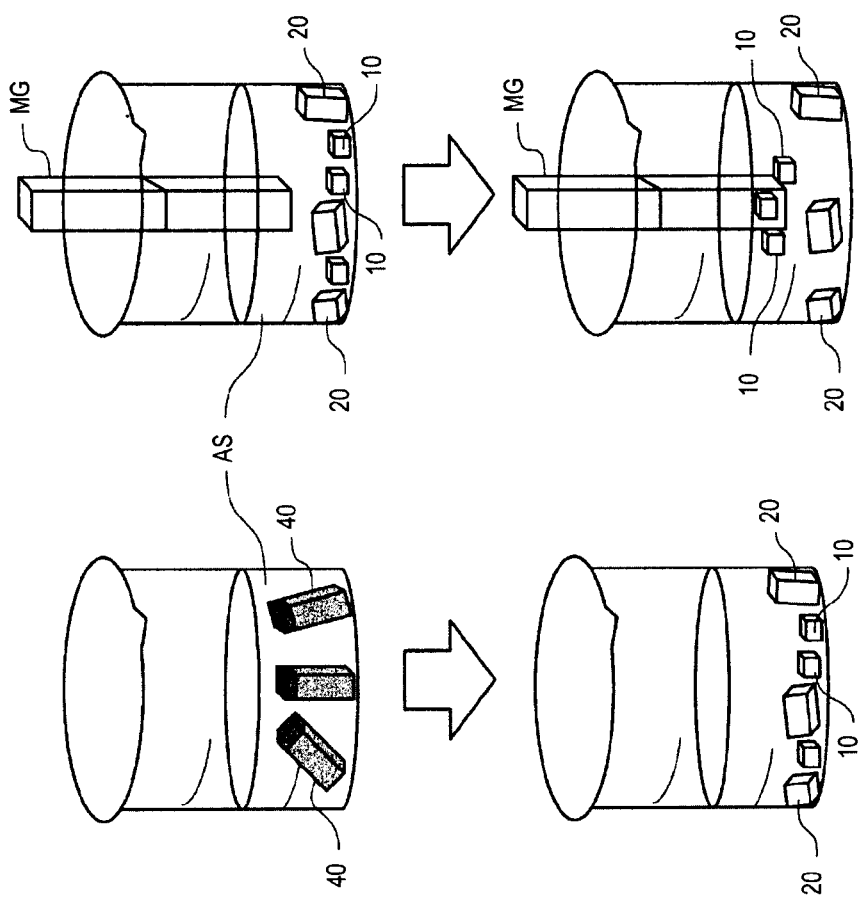
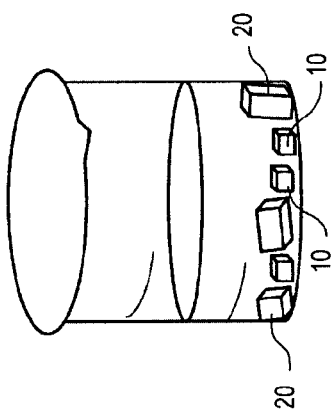
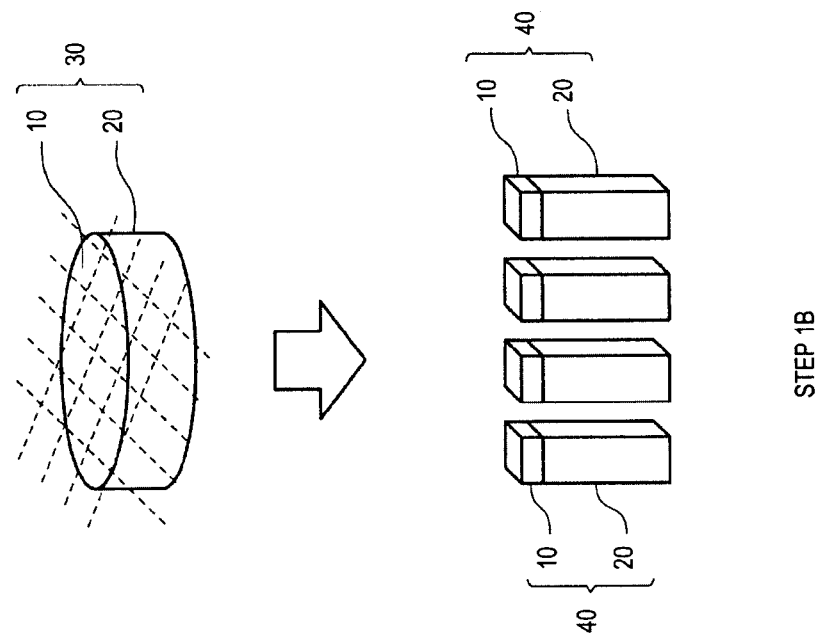

THERMISTOR SINTERED BODY AND METHOD FOR MANUFACTURING THERMISTOR SINTERED BODY

CROSS-REFERENCE TO RELATED APPLICATIONS

This is the National Stage of PCT international application PCT/JP2021/041493 filed on Nov. 11, 2021, which is incorporated herein by reference in its entirety.

TECHNICAL FIELD

The present invention relates to improving the thermal response speed of an NTC thermistor.

BACKGROUND ART

A thermistor is an abbreviation for thermally sensitive resistor, and is a metal oxide that measures temperature by utilizing the fact that electrical resistance changes with temperature.

Thermistors are classified into negative temperature coefficient (NTC) type and positive temperature coefficient (PTC) type.

Manganese oxide ($Mn_3O_4$) has a typical spinel structure as an NTC thermistor. An oxide sintered body having a composition of $M_xMn_{3-x}O_4$ in which M element (one or more of Ni, Co, Fe, Cu, Al, and Cr) is added to this basic composition is also known.

Moreover, a compound oxide, for example, an oxide sintered body with $YCrO_3$ as its basic composition, has a typical perovskite structure as a PTC thermistor.

Patent Literature 1 discloses an NTC thermistor film in which ceramic powder composed of a spinel crystal phase containing Ni and Mn is vacuum-deposited on one surface of a substrate by a room temperature vacuum powder injection method (AD method). The thermistor film of Patent Literature 1 has a thickness of 0.2 µm to 50 µm and a relative density of 95% or more. The NTC thermistor film of Patent Literature 1 has microstructures of nanocrystalline grains and a characteristic constant (B) of 3000 K or more.

As an example, the production of the thermistor film of Patent Literature 1 includes charging $NiMn_2O_4$ spinel phase powder into a mixing container within a film-forming apparatus, securing a glass substrate onto a stage, and subsequently vacuum-injecting the powder onto the glass substrate five times at room temperature.

CITATION LIST

Patent Literature

Patent Literature 1: JP 5180987 B

SUMMARY OF INVENTION

Technical Problem

According to the disclosure of Patent Literature 1, it is understood that the NTC thermistor film described therein is joined to a substrate composed of materials such as glass or ceramics. Therefore, since the thermistor film of Patent Literature 1 requires the existence of a substrate, in addition to being restricted in use, it has a high heat capacity that hinders a thermal response speed. The thermistor film might be separated from the substrate to remove usage restrictions. However, even when the thermistor film can be separated, it is assumed that the thermistor film cannot withstand practical use as a temperature sensor because the thermistor film is a deposited film and lacks strength.

Accordingly, an objective of the present invention is to provide a thermistor sintered body that maintains the necessary strength as a temperature sensor even when separated from a substrate, and its corresponding manufacturing method.

Solution to Problem

A thermistor sintered body according to the present invention has a thickness in a range of 1 µm to 100 µm and an area in a range of 1 $mm^2$ to 10 $mm^2$, and the thermistor sintered body is composed of a single body of a sintered body having a composition of $NiMn_2O_4$.

In the thermistor sintered body according to the present invention, the thickness is preferably in a range of 10 µm to 50 µm and the area is in a range of 2 $mm^2$ to 5 $mm^2$.

In the thermistor sintered body according to the present invention, 20% to 90% of Mn in the $NiMn_2O_4$ is preferably substituted with Fe.

The present invention provides a manufacturing method of the thermistor sintered body described above. This manufacturing method includes: a first step of dropping a raw material liquid onto a surface of a rotatably supported substrate; a second step of rotating the substrate with the dropped raw material liquid and spreading the raw material liquid; a third step of forming the sintered body having the composition of $NiMn_2O_4$ on the surface of the substrate by heating and holding the raw material liquid and the substrate on which the raw material liquid has been placed; and a fourth step of separating the sintered body from the substrate.

In the manufacturing method of the present invention, the third step is preferably performed after repeating the first step and the second step a plurality of times.

In the manufacturing method of the present invention, the sintered body is preferably separated from the substrate in the fourth step based on a difference in linear expansion coefficient between the sintered body and the substrate.

In the manufacturing method of the present invention, the sintered body is preferably separated from the substrate in the fourth step by selectively dissolving the substrate.

In the manufacturing method of the present invention, a thermistor joined body, in which the sintered body is formed on the surface of the substrate, is preferably cut and divided in a grid pattern when viewed from above in order to generate a plurality of thermistor divided bodies; and the sintered body is preferably separated from the substrate by selectively dissolving a boundary portion in each of the plurality of generated thermistor divided bodies, the boundary portion being located between the sintered body and the substrate.

In the manufacturing method of the present invention, a trace of a material forming the substrate preferably remains on a separation surface, which is a surface of the sintered body from which the substrate is separated.

The manufacturing method of the present invention preferably includes recovering the sintered body separated from the substrate by magnetic force.

Advantageous Effects of Invention

According to the present invention, it is possible to obtain a thermistor sintered body with the required strength for a temperature sensor even when it is separated from a substrate.

BRIEF DESCRIPTION OF DRAWINGS

FIG. 1 is a diagram illustrating a procedure for manufacturing a thermistor sintered body according to an embodiment of the present invention;

FIG. 2A shows a cross section of part of a thermistor sintered body 10 and a substrate 20 by a scanning electron microscope (SEM, 1000 times), and FIG. 2B shows a cross section near a boundary between the thermistor sintered body 10 and the substrate 20 by the scanning electron microscope (SEM, 20000 times);

FIG. 3A is an X-ray diffraction pattern, and FIG. 3B is a photograph showing a substrate and a $NiMn_2O_4$ sintered body separated from the substrate;

FIG. 4A is a graph for sample 2, and FIG. 4B is a graph for sample 4;

FIG. 5A is a graph for samples 1 and 4, and FIG. 5B is a graph for sample 3;

FIG. 6A is an example of sample 2, and FIG. 6B is an example of sample 3;

FIG. 8A shows the separation surface (15000 times), FIG. 8B shows the separation surface (2000 times), and FIG. 8C shows the free surface (15000 times);

FIG. 9 relates to a calcined powder of Fe-substituted $NiMn_2O_4$, where

FIG. 11 relates to a Fe-substituted $NiMn_2O_4$ sintered body, where FIG. 11A is an X-ray diffraction pattern, and FIG. 11B is a table showing a relationship between a substitution ratio of Fe and a density of the sintered body and the like;

FIG. 12 is SEM photographs of surfaces and cross sections of the Fe-substituted $NiMn_2O_4$ sintered bodies;

FIGS. 14A and 14B are graphs showing a relationship between the Fe substitution ratio and characteristics of the Fe-substituted $NiMn_2O_4$ sintered bodies, where FIG. 14A relates to B constant, and FIG. 14B relates to room temperature resistance and response speed;

FIGS. 16A and 16B are graphs showing residual magnetization and saturation magnetization in the Fe-substituted $NiMn_2O_4$ calcined powders;

FIGS. 17A to 17C are diagrams illustrating a recovery procedure of thermistor sintered bodies using ferrimagnetism; FIG. 18A shows a surface thereof and FIG. 18B shows a cross section thereof.

DESCRIPTION OF EMBODIMENT

Figure 2A:
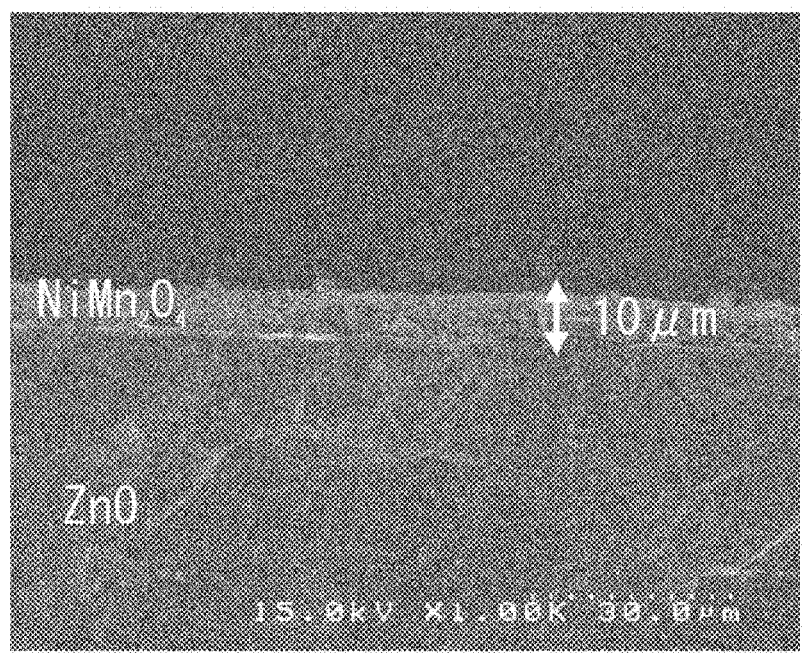
FIGS. 2A and 2B are micrographs showing a cross section of the thermistor sintered body manufactured by a procedure of FIG. 1, where

An embodiment of a thermistor sintered body and its manufacturing method according to the present invention will be described below with reference to the accompanying drawings. This embodiment includes a first embodiment relating to a $NiMn_2O_4$ sintered body without a substrate and a second embodiment relating to a Fe-substituted $NiMn_2O_4$ sintered body. Hereinafter, the first embodiment and the second embodiment will be described in this order.

First Embodiment: See FIGS. 1 to 8C

The first embodiment describes a $NiMn_2O_4$ sintered body (hereinafter sometimes referred to as a substrate-free sintered body) without a substrate and its manufacturing method. This substrate-free sintered body is obtained by separating a $NiMn_2O_4$ sintered body formed on a substrate from the substrate.

[Manufacturing Method of Substrate-Free Sintered Body: FIG. 1]

First, a method for manufacturing a thermistor sintered body 10 will be described with reference to FIG. 1.

This manufacturing method includes the following step 1A, step 2A, step 3A, and step 4A.

[Step 1A]: A raw material liquid RL is dropped onto a surface of a substrate 20 that is rotatably supported.

As an example, the raw material liquid RL contains nickel chloride ($NiCl_2 \cdot 6H_2O$) and manganese chloride ($MnCl_2 \cdot 6H_2O$) as solutes, and water ($H_2O$), ethanol ($C_2H_6O$), and ethylene glycol ($C_2H_6O_2$) as solvents. The ratio (molar ratio) of nickel chloride and manganese chloride in this raw material liquid is Ni:Mn=1:2. The ratio (weight ratio) of ethanol (ET) and ethylene glycol (EG) is ET:EG=4:1.

Although dimensions of the substrate 20 are arbitrary, in the first embodiment, the substrate 20 having a disk shape composed of ZnO having a diameter of 10 mm and a thickness of 0.5 mm to 1.0 mm is used. A sintered body can be used as the ZnO forming the substrate 20.

The reason for using ZnO as the substrate 20 is to leverage the thermal stress during the separation of the $NiMn_2O_4$ sintered body from the substrate 20. In other words, $NiMn_2O_4$ and ZnO have a significant difference in their linear expansion coefficients, as shown below. After the sintering process, this disparity generates thermal stress between $NiMn_2O_4$ and ZnO due to their differing linear expansion coefficients, facilitating their subsequent separation.

Linear Expansion Coefficient $$NiMn_2O_4; 8.6 \times 10^{-6}/K$$

$$ZnO; 6.5 \times 10^{-6}/K$$

In the present embodiment, ZnO is used as the substrate 20 due to its significant difference in linear expansion coefficient compared to $NiMn_2O_4$, in order to promote separation through thermal stress. However, alternative materials, for example, oxide ceramics such as zirconium oxide ($ZrO_2$) or nitride ceramics such as silicon nitride ($Si_3N_4$) can be used for the substrate 20 if separation is not intended to be achieved through thermal stress.

When thermal stress is not utilized, by selectively dissolving the substrate 20 with an acid solution, the thermistor sintered body 10 can be separated from the substrate 20 as a result.

[Step 2A]: The dropped raw material liquid RL is spread to a uniform thickness on the substrate 20.

In the first embodiment, spin coating is used in which the substrate 20 is rotated to apply a centrifugal force to the raw material liquid RL in order to achieve the purpose of step 2A. In this embodiment, as an example, spin coating was performed by rotating the substrate 20 at a rotation speed of 2000 rpm for 90 seconds.

[Step 3A]: After step 2A, sintering is performed in air to produce a $NiMn_2O_4$ sintered body from the raw material liquid RL.

For the sintering in this embodiment, as an example, a condition of holding at 1100° C. for five hours was adopted. In addition, as sintering conditions, a holding temperature range of 1000° C. to 1200° C. and a holding time range of 1 hour to 10 hours can be adopted.

Thus, a thermistor joined body 30 in which the thermistor sintered body 10 is joined onto the substrate 20 is obtained.

[Step 4A]: The thermistor sintered body 10 is separated from the substrate 20.

Separation can utilize thermal stress as described above, as an example. Separation using this thermal stress can occur in a process of cooling down to room temperature after holding the sintering temperature in step 3A. In separation using this thermal stress, the faster a cooling rate in this process, the more likely separation occurs. Therefore, depending on conditions such as dimensions of the thermistor sintered body 10 and the substrate 20, the separation can be achieved through air cooling or by blowing a cooling medium with a faster cooling rate than air cooling.

Figure 3A:
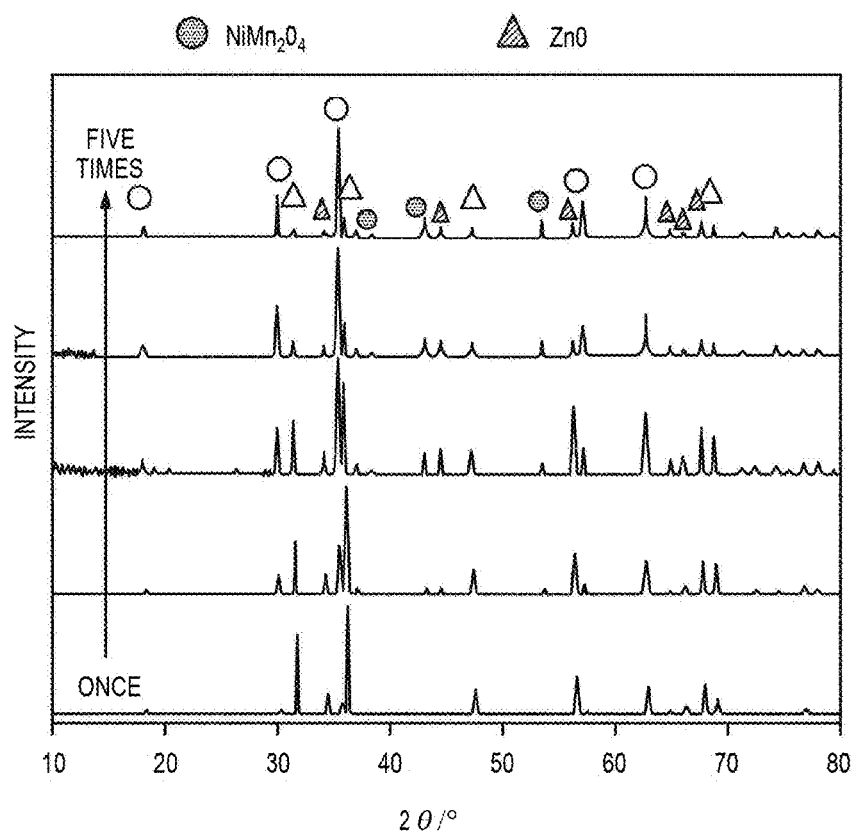
FIGS. 3A and 3B show the thermistor sintered body manufactured by the procedure of FIG. 1, where
Figure 3B:
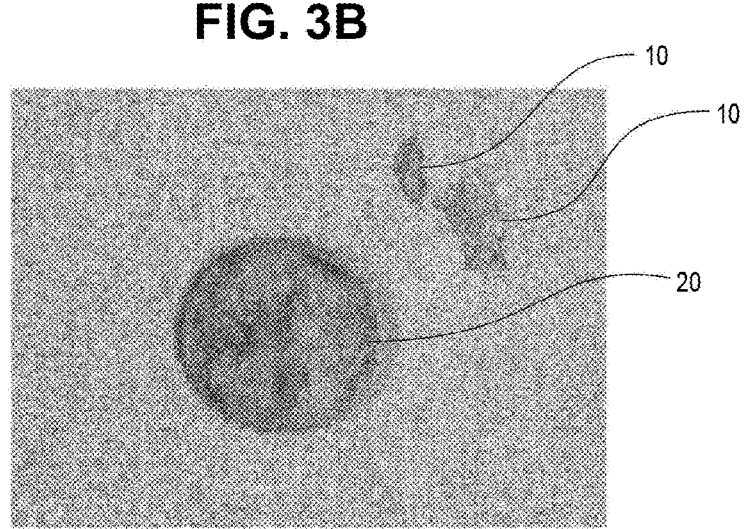

FIG. 3B shows the thermistor sintered body 10, which exists as a separate entity from the substrate 20 following the sintering process. In this example, the thermistor sintered body 10 remains on a surface of the substrate 20, but a part of the thermistor sintered body 10 is separated even when no particular stress is applied after sintering. Therefore, it was confirmed that the thermistor sintered body 10 can be separated from the substrate 20 by thermal stress based on the difference in linear expansion coefficient between the thermistor sintered body 10 and the substrate 20.

As another separation method, the substrate 20 supporting the thermistor sintered body 10 is selectively dissolved. For example, when the thermistor sintered body 10 is $NiMn_2O_4$ and the substrate 20 is ZnO, hydrochloric acid (HCl aqueous solution) can be used. Hydrochloric acid selectively dissolves the substrate 20 (ZnO) without dissolving the thermistor sintered body 10 ($NiMn_2O_4$). In this case, when a boundary portion of the substrate 20 in contact with the thermistor sintered body 10 is dissolved first, the thermistor sintered body 10 can be separated from the substrate 20 in a relatively short time.

[Repeating Step 1A to Step 3A]

In the above, an example in which steps 1A to 3A are performed once is described, but as illustrated in FIG. 1, steps 1A to 3A can be repeated a plurality of times. A thickness of the thermistor sintered body 10 is adjusted and increased by repeating steps 1A to 3A, that is, the steps up to sintering, so that the thermistor sintered body 10 with high strength can be obtained.

Observation by X-ray diffraction, which will be described below, was performed on a sintered body that had undergone the steps up to sintering only once, and sintered bodies that had undergone the steps two, three, four, and five times.

Figure 2B:
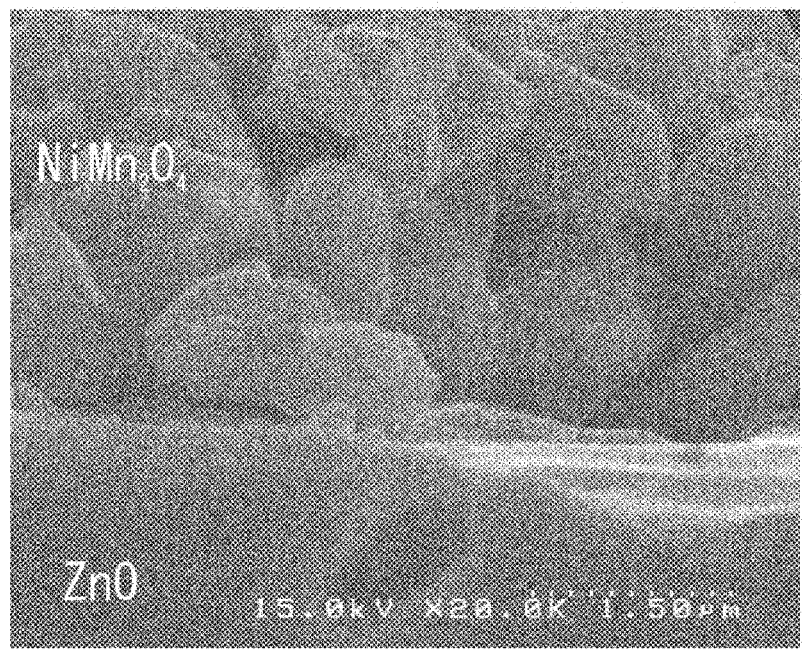

[Structure Observation: FIGS. 2A and 2B]

After repeating step 1A to step 3A three times, a cross-sectional structure was observed with a scanning electron microscope (SEM). As a result, as shown in FIG. 2A, it was observed that the thickness of the thermistor sintered body 10 made of $NiMn_2O_4$ was 10 µm. Moreover, as shown in FIG. 2B, the thermistor sintered body 10 has voids between grains made of $NiMn_2O_4$, but it was confirmed that the thermistor sintered body 10 has a sufficient density.

[X-Ray Diffraction: FIG. 3A]

Next, the obtained thermistor sintered body 10 was subjected to X-ray diffraction (XRD). Results are shown in FIG. 3A. FIG. 3A shows diffraction results of a sintered body that underwent the step 1A through step 3A, representing the sequential stages leading up to sintering, only once, as well as diffraction results of sintered bodies that underwent the same steps two, three, four, and five times.

As shown in FIG. 3A, the structures required for $NiMn_2O_4$ were observed in all the thermistor sintered bodies 10 which underwent the steps one to five times.

Also, although not shown in FIG. 3A, from other X-ray diffraction results, crystalline orientations of the h20 plane and the h11 plane (h is an integer) were observed, and it was confirmed that crystalline orientations of the 220 plane and the 311 plane were particularly large.

[Thermistor Characteristics: FIGS. 4A to 5B]

Next, using the following four samples 1, 2, 3 and 4, characteristics 1 and 2 shown below were measured in which the thermistor sintered body 10 was used as a thermistor. The thickness of samples 1 to 4 is 30 µm in common.

Sample 1: area 1.56 mm²
Sample 2: area 2.42 mm²
Sample 3: area 5.61 mm²
Sample 4: area 8.71 mm²

Characteristic 1 (FIGS. 4A and 4B): Relationship between temperature change (Temperature) and electrical resistance change (Resistance) in samples 2 and 4

Characteristic 2 (FIGS. 5A and 5B): Thermal responsiveness of samples 1 (100° C.), 3, and 4 (100° C.)

Figure 4A:
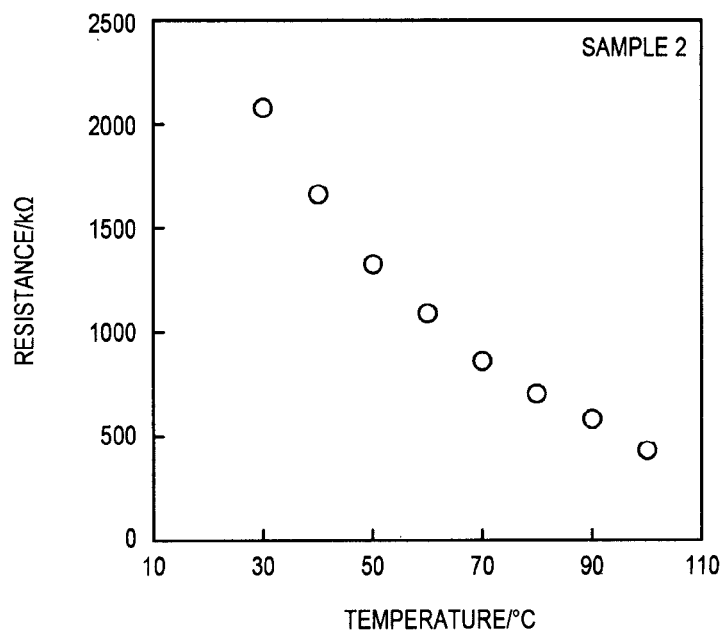
FIGS. 4A and 4B show a relationship between measured temperature (temperature/° C.) and electrical resistance (resistance/k$\Omega$) of the sintered body manufactured by the procedure of FIG. 1, where
Figure 4B:
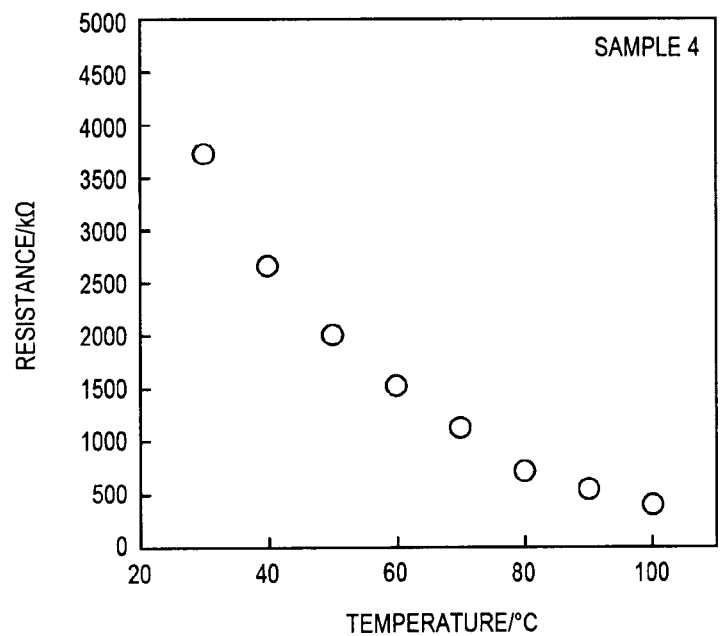

As shown in FIGS. 4A and 4B, both samples 2 and 4 showed a decrease in electrical resistance with increasing the measurement temperature. This observation confirms that the thermistor sintered bodies 10, which comprise samples 2 and 4, meet requirements for an NTC thermistor.

The characteristics shown in FIGS. 4A and 4B are equivalent to those of the currently commonly used NTC thermistor.

Figure 5A:
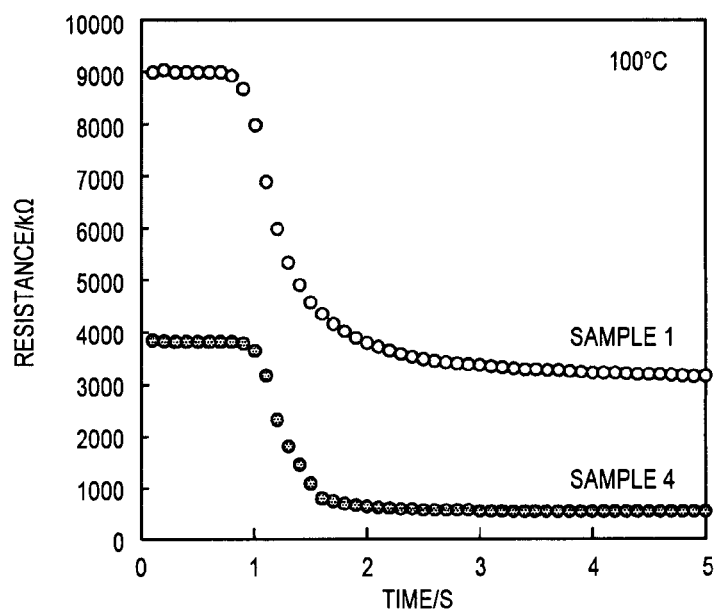
FIGS. 5A and 5B show thermal responsiveness of the sintered body manufactured by the procedure of FIG. 1, where
Figure 5B:
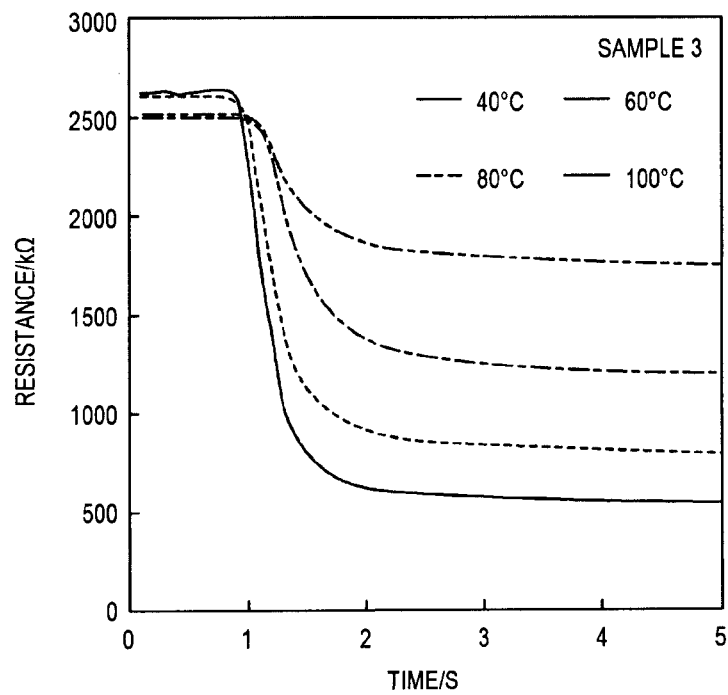

Moreover, as shown in FIGS. 5A and 5B, all of samples 1, 3, and 4 exhibit high sensitivity, with response times ranging from about 1.1 seconds to 1.2 seconds at 100° C. This confirms that the thermistor sintered bodies 10 possess the necessary properties for an NTC thermistor. Although not shown in FIGS. 5A and 5B, the response time of sample 2 at 100° C. is also within the above range.

Figure 6A:
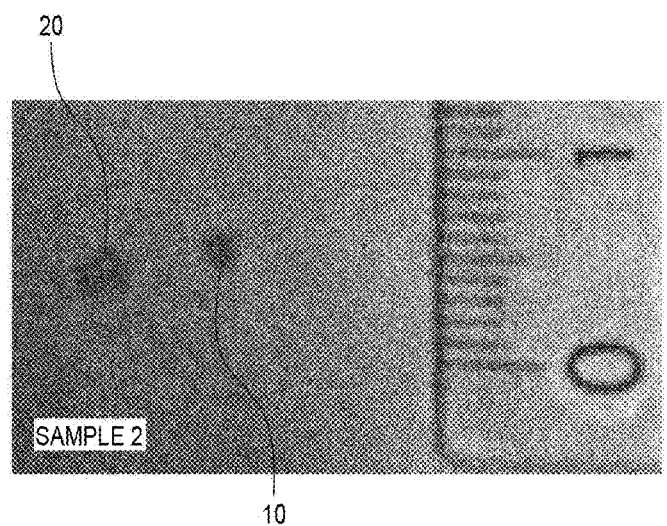
FIGS. 6A and 6B are photographs showing a thermistor sintered body manufactured by changing an area of the substrate, where
Figure 6B:
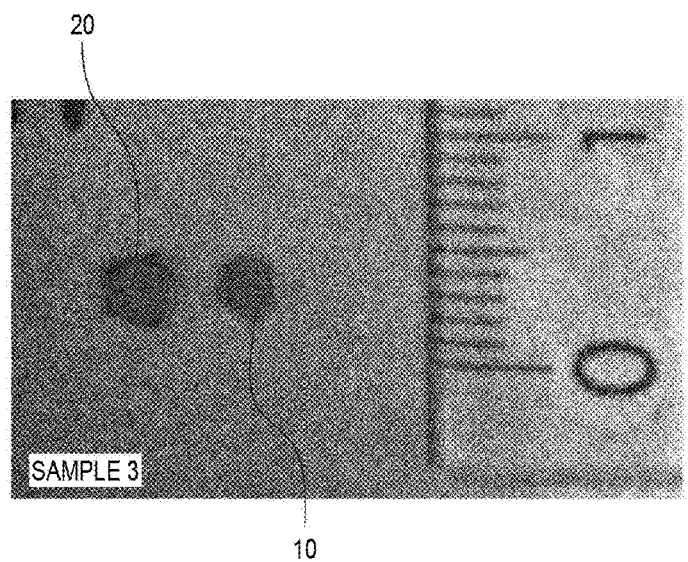

[Area of Thermistor Sintered Body 10 Separated from Area of Substrate 20: FIGS. 6A and 6B]

FIGS. 6A and 6B show an example of the substrate 20 and the thermistor sintered body 10, which exists as a separate entity from the substrate 20 in samples 2 and 3 described above. In both samples 2 and 3, the thermistor sintered body 10 is separated from the substrate 20 due to thermal stress.

FIGS. 6A and 6B show a corresponding relationship between the area of the substrate 20 and the area of the thermistor sintered body 10. Increasing the area of the substrate 20 allows for an increase in the area of the thermistor sintered body 10.

Here, it is desired that the thermistor sintered body 10 has a small dimension in a thickness direction and a large area in order to improve the thermal response speed. However, when the thickness is extremely thin, it becomes difficult to obtain strength, so the thickness is preferably in a range of 1 μm to 100 μm. A more preferred thickness is 10 μm to 50 μm. Also, the area is preferably in a range of 1 $mm^2$ to 10 $mm^2$, more preferably in a range of 2 $mm^2$ to 5 $mm^2$, in consideration of the thickness.

[Trace of Substrate 20 in Separated Thermistor Sintered Body 10: FIGS. 7A to 7C, FIGS. 8A to 8C]

As described above, the thermistor sintered body 10 is separated from the substrate 20, and traces of the substrate 20 were confirmed on the separation surface of the thermistor sintered body 10 from which the substrate 20 was separated. The trace was confirmed by immersing the obtained thermistor joined body 30 in hydrochloric acid (HCL concentration: 1 mol/L) to separate the substrate 20.

Figure 7A:
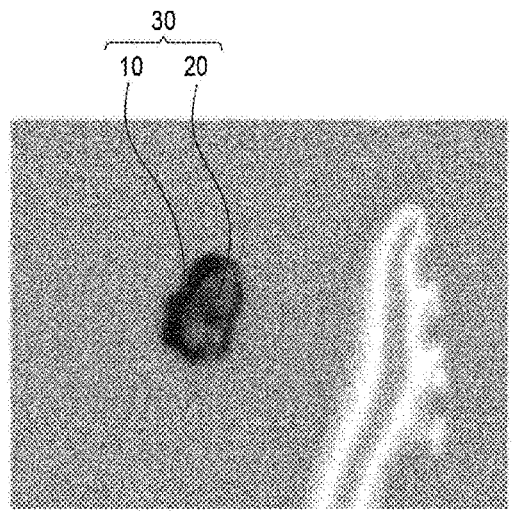
FIG. 7A shows a side of a separation surface of the thermistor sintered body after the thermistor sintered body from which the substrate has been separated is immersed in hydrochloric acid for only 30 minutes.
Figure 7B:
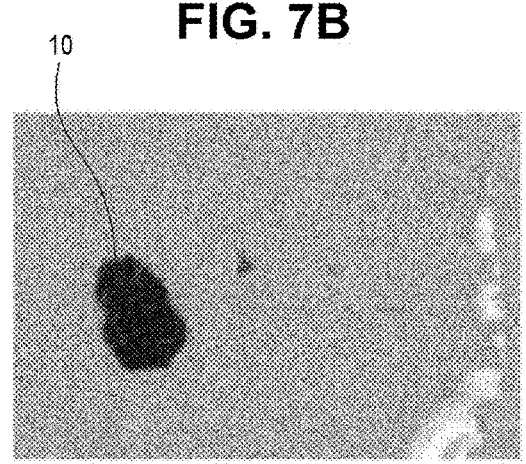
FIG. 7B shows the side of the separation surface of the thermistor sintered body after it has been similarly immersed in hydrochloric acid for 120 minutes.
Figure 7C:
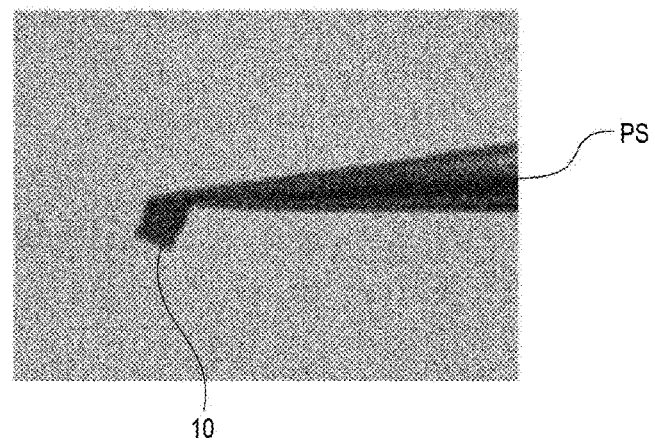
FIG. 7C shows a state in which the thermistor sintered body is held with tweezers after being immersed in hydrochloric acid for 120 minutes.

FIG. 7A shows the side of the separation surface of the thermistor sintered body 10 after the thermistor joined body 30 has been immersed in hydrochloric acid for 30 minutes. In FIG. 7A, the black part is the thermistor sintered body 10 and the surface thereof forms the separation surface. The gray part covering most of this separation surface is the trace of ZnO which is the substrate 20. After 120 minutes of immersion in hydrochloric acid, as shown in FIG. 7B, this trace almost disappears due to dissolution by hydrochloric acid. The thermistor sintered body 10 from which the trace of the substrate 20 has disappeared has such a strength that cracks do not occur even when it is grasped with tweezers, as shown in FIG. 7C.

Figure 8A:
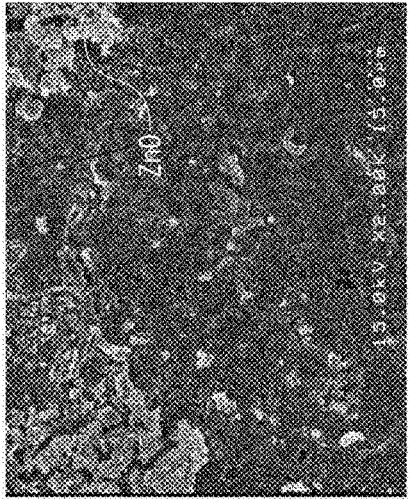
FIGS. 8A to 8C are SEM photographs showing the separation surface and a free surface of the thermistor sintered body after the thermistor sintered body from which the substrate is separated is immersed in hydrochloric acid for 120 minutes, where
Figure 8B:
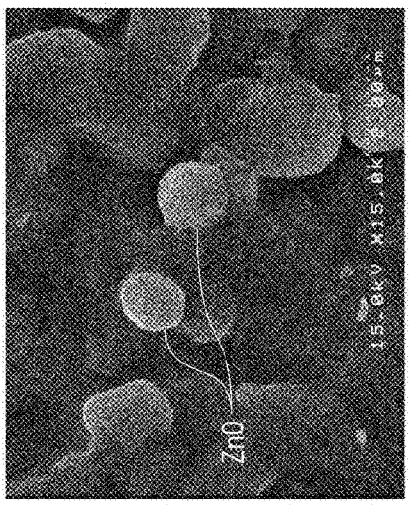
Figure 8C:
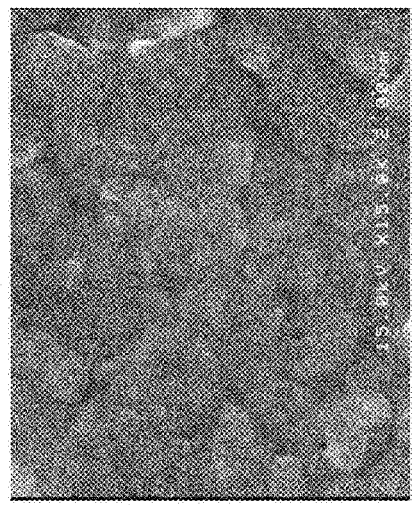

FIGS. 8A to 8C show results of microscopic observation of the traces on the substrate 20. The observation was made on the separation surface of the thermistor sintered body 10 after immersion in hydrochloric acid for 120 minutes and a surface (free surface) opposite to the separation surface.

As shown in FIGS. 8A and 8B, traces of ZnO, which is the substrate 20, are observed as white on the separation surface. In the former, i.e., FIG. 8A, the image is captured at a higher magnification compared to FIG. 8B.

As shown in FIG. 8C, no trace of ZnO is observed on the free surface. However, a notable difference can be observed between FIG. 8A and FIG. 8C. The separation surface (FIG. 8A) shows pronounced unevenness, while the free surface (FIG. 8C) appears smooth.

As described above, as in this embodiment, the free surface and the separation surface of the obtained thermistor sintered body 10 on the substrate 20 by sintering can be specified through observing the front surface and the back surface after the substrate 20 is separated.

Second Embodiment: See FIGS. 9A to 17C

Next, a second embodiment of Fe-substituted $NiMn_2O_4$ ($NiMn_{2-x}Fe_xO_4$) sintered bodies in which Mn of $NiMn_2O_4$ is replaced with Fe will be described. Substituting Fe for Mn in the second embodiment aims at improving the density of the sintered bodies and imparting magnetism to the sintered bodies. Improving the density leads to improving the mechanical strength when applied to a thermistor, and imparting magnetism makes it possible to recover minute sintered bodies through attraction with magnets.

Hereinafter, the properties of the Fe-substituted $NiMn_2O_4$ calcined powder, the properties of the Fe-substituted $NiMn_2O_4$ sintered body, the thermistor properties of the Fe-substituted $NiMn_2O_4$ sintered body, and the magnetic properties of the Fe-substituted $NiMn_2O_4$ calcined powder are described in this order.

Figure 9A:
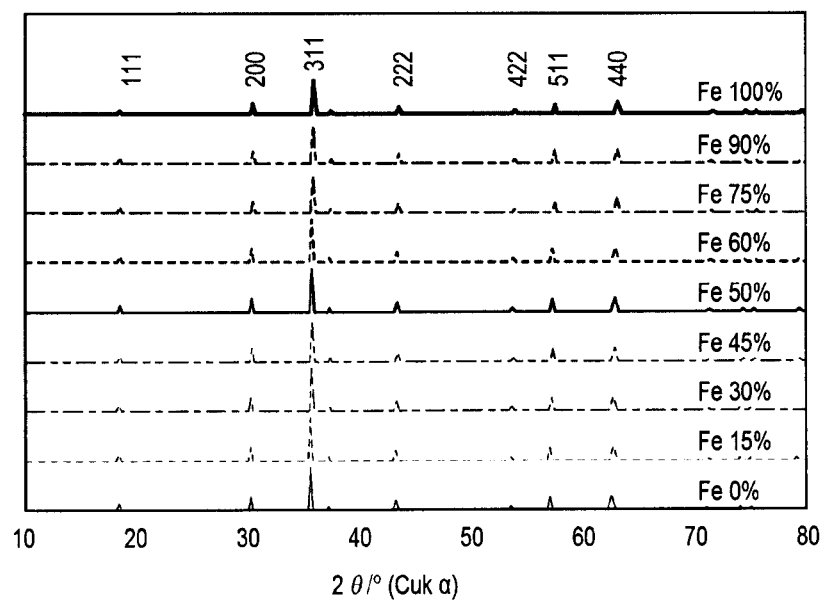
FIG. 9A is an X-ray diffraction pattern.
Figure 9B:
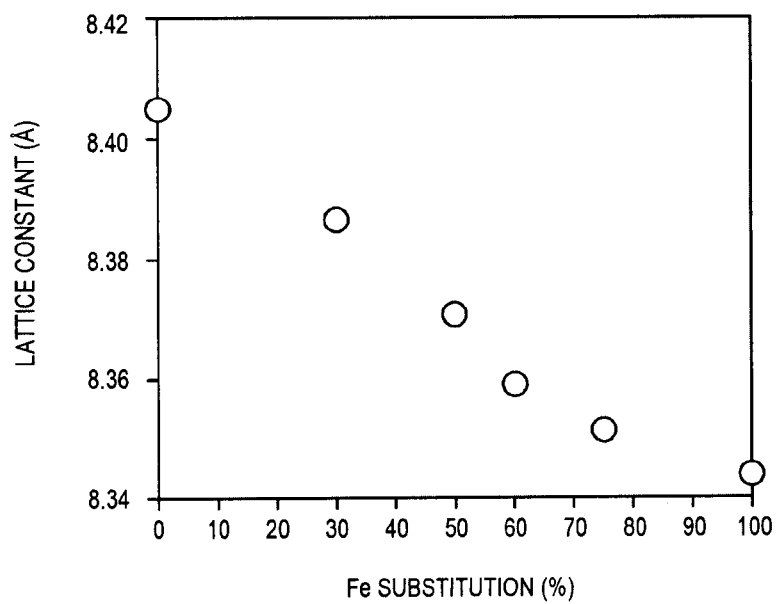
FIG. 9B is a graph showing a relationship between Fe substitution and lattice constant.
Figure 10:
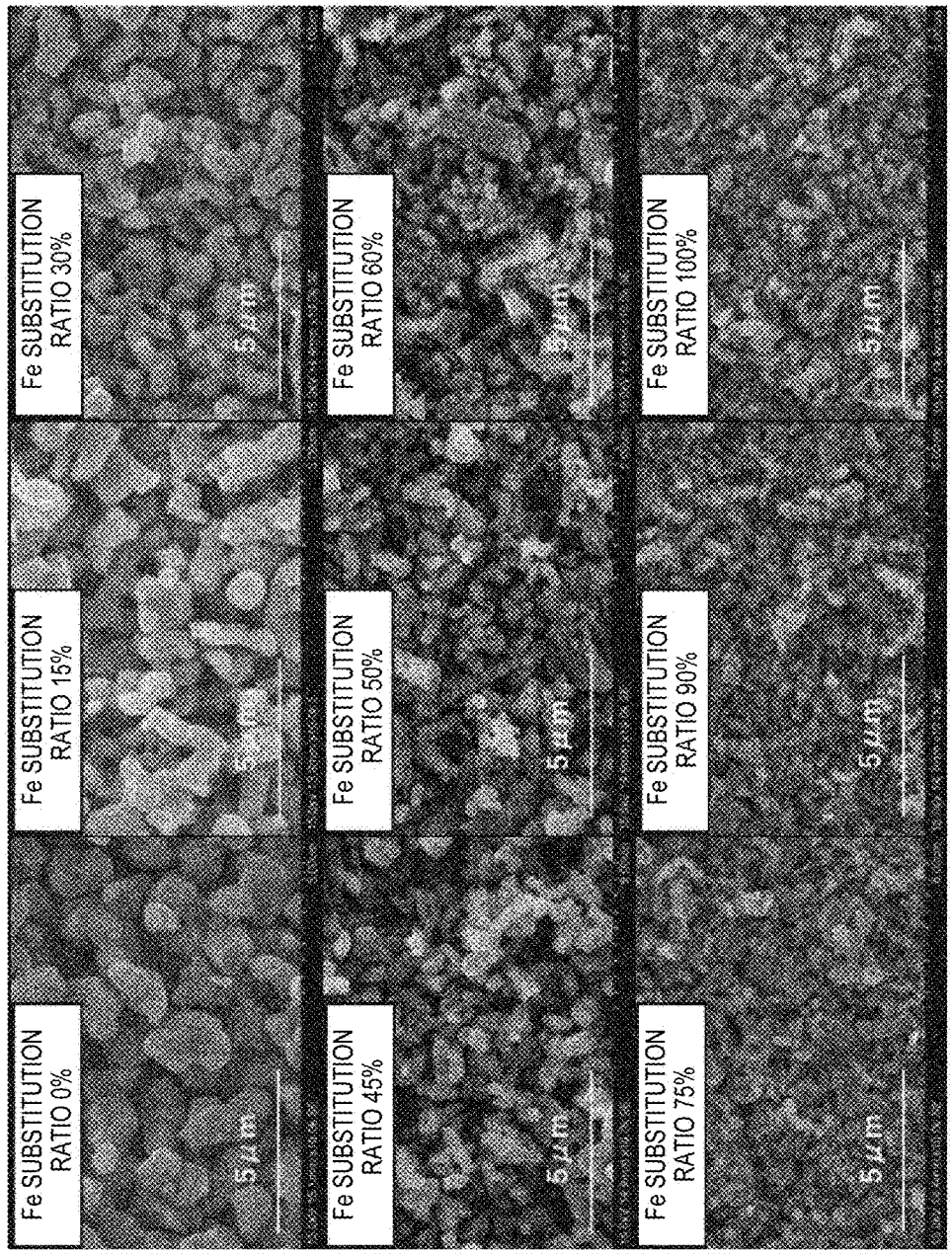
FIG. 10 is an SEM photograph of the calcined powder of Fe-substituted $NiMn_2O_4$.

[Structure of Fe-Substituted $NiMn_2O_4$ Calcined Powder: FIGS. 9A to 10]

Fe-substituted $NiMn_2O_4$ ($NiMn_{2-x}Fe_xO_4$) calcined powders were manufactured by the following procedures, and the calcined powders were observed by X-ray diffraction and the lattice constant thereof was determined. The results are shown in FIGS. 9A and 9B. A substitution ratio x (%) of Mn by Fe is as follows, and nine kinds of calcined powders were produced. A sample with a Fe substitution ratio x of 0% is $NiMn_2O_4$ calcined powder, and a sample with a Fe substitution ratio x of 100% is $NiFe_2O_4$ calcined powder.

As shown in FIG. 9A, in the calcined powders obtained here, a single phase of a spinel-type compound was generated at all Fe substitution ratios. Further, it was confirmed that these calcined powders are of solid solution type and these calcined powders dissolve completely without a secondary phase, even when Mn is replaced with Fe.

Moreover, as shown in FIG. 9B, it was confirmed that the lattice constant of the calcined powder decreased as the Fe substitution ratio increased.

Further, FIG. 10 shows SEM photographs of the powders calcined at 1000° C., and it was confirmed that grain growth during calcination was suppressed as the substitution ratio of Fe increased.

[Production Procedures of $NiMn_{2-x}Fe_xO_4$ Calcined Powders and Sintered Bodies]

The manufacturing procedures of the $NiMn_{2-x}Fe_xO_4$ calcined powders and the sintered bodies will be described. First, the manufacturing procedures of the calcined powders will be described.

Commercially available nickel sulfate (II, $NiSO_4$), manganese sulfate (II, $MnSO_4$), and iron sulfate (II, $FeSO_4$) were weighed such that Ni:Mn:Fe=1:2-x:x (molar ratio), and raw material mixed solutions were obtained by stirring until the raw materials were dissolved in ion-exchanged water. Then, an aqueous solution of ammonium oxalate (($NH_4)_2C_2O_4$) was added to the raw material mixed solutions, and after stirring for 24 hours, the precipitates were recovered by suction filtration, and the recovered materials were dried overnight in a dryer at 120° C. to obtain coprecipitated powders. The obtained coprecipitated powders were calcined in air at 400° C. for two hours to obtain calcined powders.

Next, the manufacturing procedures of the sintered bodies are as follows.

Disk-shaped molded bodies (diameter: 10 mm) were produced by uniaxially pressing (pressure: 98 MPa) the calcined powders obtained by the above procedures. The molded bodies were heated from room temperature to 1100° C. at a rate of 5° C./min, and after sintering these molded bodies in air at 1100° C. for five hours, it was allowed to cool to obtain $NiMn_{2-x}Fe_xO_4$ sintered bodies which are Fe-substituted $NiMn_2O_4$.

[Fe Substitution Ratio]

| Fe substitution ratio x (%): | |
|---|---|
| 0% ($NiMn_2O_4$) | 15% ($NiMn_{1.7}Fe_{0.3}O_4$) |
| 30% ($NiMn_{1.4}Fe_{0.6}O_4$) | 45% ($NiMn_{1.1}Fe_{0.9}O_4$) |
| 50% ($NiMnFeO_4$) | 60% ($NiMn_{0.8}Fe_{1.2}O_4$) |
| 75% ($NiMn_{0.5}Fe_{1.5}O_4$) | 90% ($NiMn_{0.2}Fe_{1.8}O_4$) |
| 100% ($NiFeO_4$) | |

Figures 11A, 11B:
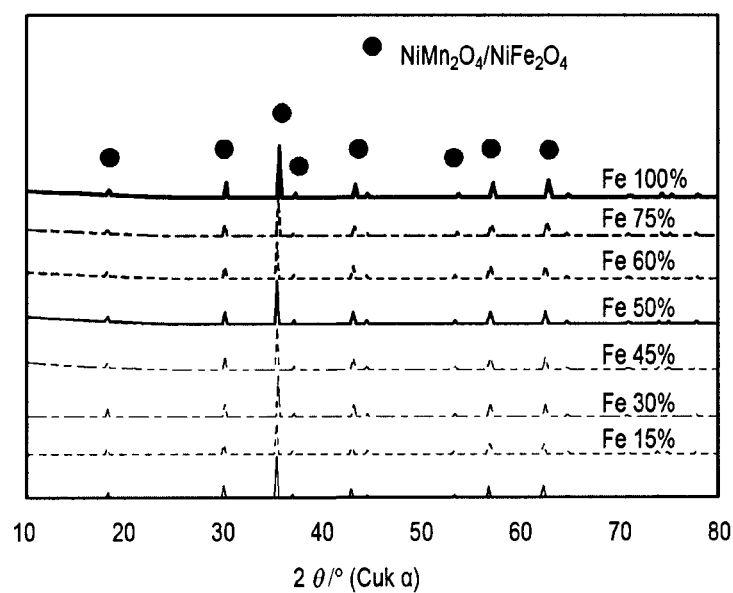

[Structure of Fe-Substituted $NiMn_2O_4$ Sintered Bodies: FIGS. 11A and 11B, FIG. 12]

Fe-substituted $NiMn_2O_4$ sintered bodies were manufactured by the procedures described above, and the sintered bodies were observed by X-ray diffraction, and the densities of the sintered bodies were obtained. The results are shown in FIGS. 11A and 11B. Further, there are nine kinds of substitution ratios x (%) of Mn by Fe as in the case of the calcined powders.

As shown in FIG. 11A, in the Fe-substituted $NiMn_2O_4$ sintered bodies, a single phase of a spinel-type compound was generated at all Fe substitution ratios, similar to the above-described results of the calcined powders at 1100° C.

The table in FIG. 11B shows the relative density calculated from the relationship between the sintered density and the theoretical density. Substituting Fe for Mn improves the relative density, and the relative density of the sintered body with a Fe substitution ratio of 50% is the highest. The improvement in the relative density due to the Fe substitution is understood to be due to the fact that grain growth of the calcined powder(s) of the solid solution was suppressed, thereby increasing the contact area between the grains and facilitating the progress of sintering.

FIG. 12 shows SEM photographs of the surfaces and cross sections of the Fe-substituted $NiMn_2O_4$ sintered bodies. As shown in FIG. 12, sintering progresses considerably and densifies the sintered bodies when the Fe substitution ratio is from 0% to 75%. Further, sintering progresses most when the Fe substitution ratio is 50%, whereas the sintered body ($NiFe_2O_4$) with the Fe substitution ratio of 100% has scattered pores and is insufficiently sintered.

From the above results, it was confirmed that substituting Fe for Mn promotes densification of the sintered bodies, resulting in a decrease in pores in the sintered bodies. A preferable Fe substitution ratio for the purpose of improving the densities of the sintered bodies is 20% to 90%, and a more preferable Fe substitution ratio is 40% to 80%.

Figure 13:
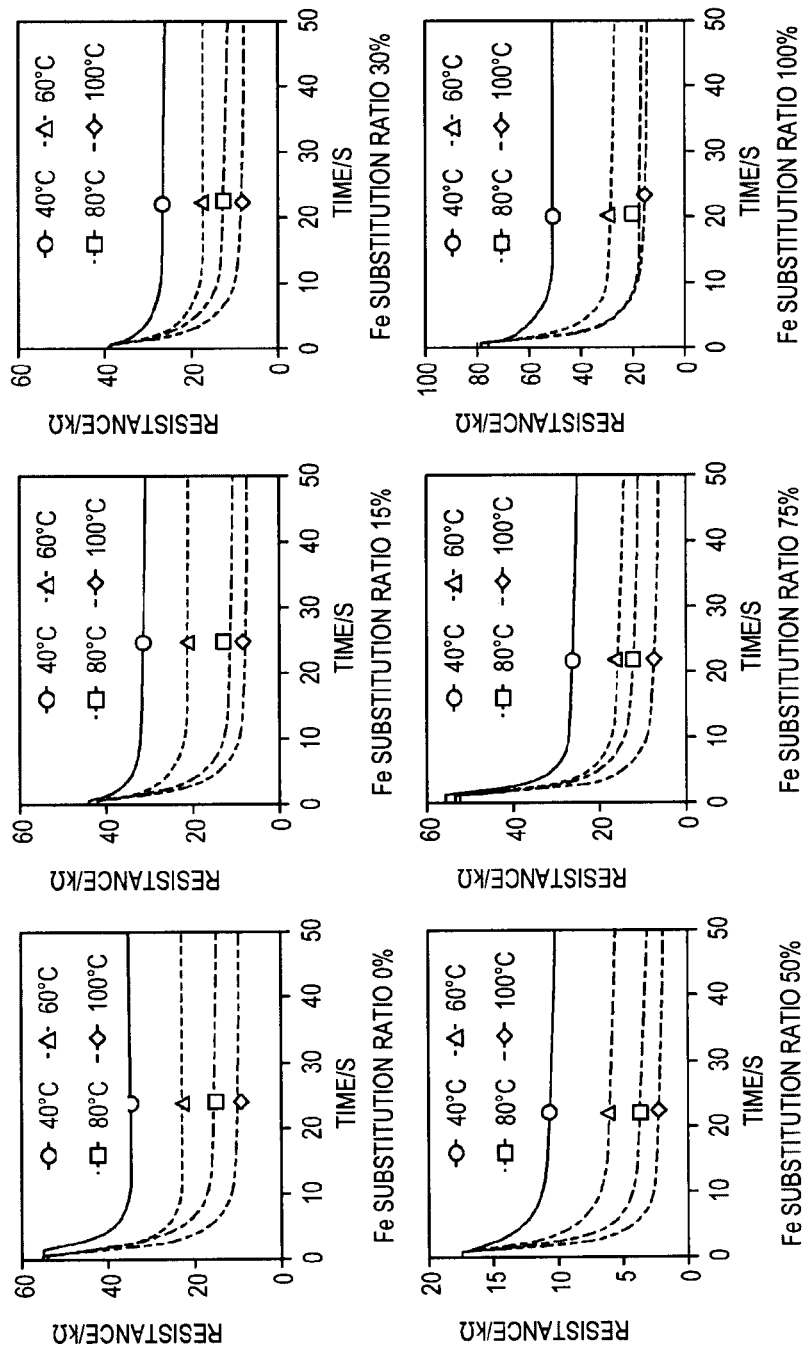
FIG. 13 is a graph showing a relationship between a Fe substitution ratio and electrical resistance of Fe-substituted $NiMn_2O_4$ sintered bodies.

[Thermistor Characteristics of Fe-Substituted $NiMn_2O_4$ Sintered Bodies: FIG. 13 and FIGS. 14A and 14B]

Next, the thermistor characteristics of the $NiMn_{2-x}Fe_xO_4$ sintered bodies obtained above were measured. The measured thermistor characteristics include changes in electrical resistance at various temperatures (FIG. 13), B constants (FIG. 14A) with temperature changes, room temperature resistance values, and response speeds (FIG. 14B). The measurement conditions of characteristics are as described below.

As shown in FIG. 13, in all of the sintered bodies with Fe substitution ratios of 0% to 100%, heat conduction to the sintered bodies is almost completed with the passage of time, and the electric resistance of each of the sintered bodies reaches a constant value. In addition, in any given sample, it was observed that the electrical resistance decreases as the ambient temperature increases, confirming that each of the samples satisfies the requirements of an NTC thermistor.

Next, as shown in FIG. 14A, the B constant representing the sensitivity as a thermistor is the highest in the sintered body with the Fe substitution ratio of 50%. Further, as shown in FIG. 14B, it was confirmed that the sintered body with the Fe substitution ratio of 50% had the lowest room temperature resistance value and the fastest response speed.

From the above results, the Fe substitution ratio when considering thermistor characteristics is preferably 15% to 75%, more preferably 30% to 75%, and even more preferably 45% to 60%.

[Measurement Conditions]

First, electrode manufacturing and a measurement method with a heat source distance of 2 mm will be described. After masking the sintered bodies with a carbon tape and depositing Pt and Pd for three minutes, an electrode was attached by connecting Ag paste and a copper wire. Each of the sintered bodies with the electrodes was attached to a digital multimeter as follows, and a temperature-variable glass heater was placed from above to measure electrical resistance.

Figure 15:
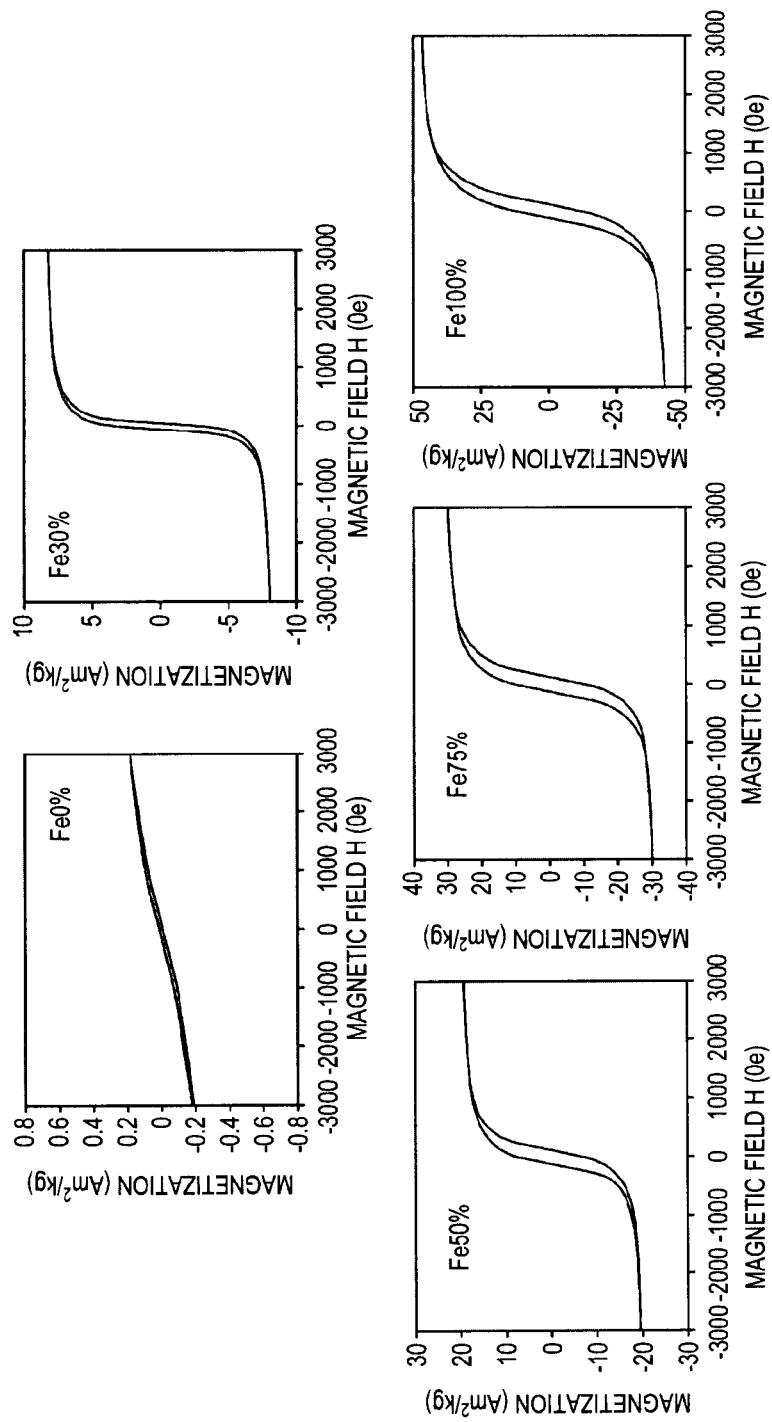
FIG. 15 is a graph showing a relationship between magnetic field and magnetization in Fe-substituted $NiMn_2O_4$ calcined powders.

[Magnetic Properties of Fe-Substituted $NiMn_2O_4$ Calcined Powders: FIG. 15 and FIGS. 16A and 16B]

Next, the results of measuring the magnetic properties of the $NiMn_{2-x}Fe_xO_4$ calcined powders at room temperature (300 K) will be described. The measured magnetic properties are the relationship between the magnetic field and magnetization shown in FIG. 15, and residual magnetization and saturation magnetization shown in FIGS. 16A and 16B.

As shown in FIG. 15, $NiMn_2O_4$ with a Fe substitution ratio of 0% exhibits paramagnetism, whereas $NiMn_{2-x}Fe_xO_4$ calcined powders with a Fe substitution ratio of 30% or more exhibit an S-shaped hysteresis curve due to ferrimagnetism. Since ferrimagnetism has spontaneous magnetization, substances with ferrimagnetism are attracted to a magnet. Although details will be described below, the fine $NiMn_{2-x}Fe_xO_4$ sintered bodies can be recovered using a magnet.

Further, from FIGS. 16A and 16B, it was confirmed that the residual magnetization and the saturation magnetization increased as the Fe substitution ratio increased. It was also confirmed that the amount of increase in residual magnetization decreased when the Fe substitution ratio was 50% or more.

Residual magnetization refers to magnetization remaining in a magnetic body after the magnetic field is removed. Saturation magnetization refers to the state when all the magnetic moments within the magnetic body become fully aligned with the direction of the applied magnetic field as the field strength increases, resulting in that magnetization is saturated.

[Recovering Method Using Ferrimagnetism: FIGS. 17A to 17C]

Next, a recovering method of the thermistor sintered body 10 separated from the substrate 20 using ferrimagnetism will be described with reference to FIGS. 17A to 17C. The procedures preceding the recovery of the thermistor sintered body 10 illustrated in FIG. 17A to 17C, which are the procedures leading up to the sintering of the thermistor sintered body 10 on the substrate 20, corresponds to the first embodiment (FIG. 1).

This recovering method includes the following step 1B, step 2B, and step 3B.

[Step 1B]: Cutting and Dividing Thermistor Joined Body 30 (FIG. 17A)

As illustrated in FIG. 17A, a plurality of thermistor divided bodies 40 are obtained by cutting the thermistor joined body 30 in which the thermistor sintered body 10 is joined to the surface of the substrate 20. The plurality of thermistor divided bodies 40 are obtained by cutting the disk-shaped thermistor joined body 30 in a grid pattern when viewed from above as illustrated in FIG. 17A. Thermistor divided bodies 40 are respectively comprised of the thermistor sintered body 10 and the substrate 20 and each of them has a rectangular parallelepiped appearance. The dimensions of each of the thermistor divided bodies 40 are, for example, 2×2×0.5 (length×width×height) mm.

Any method can be used to cut the thermistor joined body 30, and for example, a mechanical cutting method and an optical cutting method can be adopted. A dicing saw is listed as a mechanical cutting method, and a laser beam cutting is listed as an optical cutting method.

[Step 2B]: Separation of Thermistor Sintered Body 10 from Substrate 20 by Acid Dissolution (FIG. 17B)

Next, as illustrated in FIG. 17B, the thermistor sintered bodies 10 are separated from the substrates 20 by dissolving the substrates 20 by immersing the thermistor divided bodies 40 in an acid solution AS, such as hydrochloric acid (HCl) aqueous solution.

Hydrochloric acid permeates an interface between the thermistor sintered body 10 and the substrate 20, and contributes to separation by dissolving the substrate 20 facing this interface. After separation, the thermistor sintered body 10 and the substrate 20 are each a single unit.

In step 1B, for example, when cutting is performed with a dicing saw, the joining at the interface between the thermistor sintered body 10 and the substrate 20 is weakened by the vibration, thereby promoting the separation in step 2B. This effect can also be expected in a laser cutting.

[Step 3B]: Recovery of Thermistor Sintered Bodies 10 by Magnet (FIG. 17C)

Next, as illustrated in FIG. 17C, the thermistor sintered bodies 10 separated from the substrates 20 are recovered by attraction with a magnet MG. Since the substrate 20 made of ZnO has paramagnetism and is not attracted to the magnet MG, the thermistor sintered bodies 10 can be separated from the substrates 20 and recovered.

The type of the magnet MG used here may be either an electromagnet or a permanent magnet.

According to the magnet MG consisting of an electromagnet, when recovering by attraction is required, a current is applied to generate magnetic force, and when the recovered thermistor sintered bodies 10 are separated from the magnet MG and placed in a region required for the next step, the current is stopped to eliminate the magnetic force.

According to the magnet MG consisting of a permanent magnet, when the attracted thermistor sintered body 10 is separated from the magnet MG and placed in a region required for the next step, the thermistor sintered body 10 is mechanically separated from the magnet MG. In order to accomplish this, it is preferable to employ a permanent magnet with a relatively low magnetic force for the magnet MG.

In addition to the above, it is possible to select the configurations described in the above embodiments or to change them to other configurations as appropriate without departing from the gist of the present invention.

For example, zinc oxide (ZnO) was used as the substrate 20, but the same effect can be obtained by using calcium oxide (CaO). The linear expansion coefficient of CaO is $13.6\times10^{-6}$/K, which is different from $8.6\times10^{-6}$/K of $NiMn_2O_4$.

Also, in the second embodiment, Fe was used as an element to substitute Mn, but Co can also be used to substitute Mn.

In the first embodiment described above, the thermistor sintered body obtained by repeating step 1A (dropping raw material) to step 3A (sintering) three times was described, but the present invention is not limited to this. For example, step 3A (sintering) can be performed after repeating step 1A (dropping raw material) and step 2A (spin coating) a plurality of times. This procedure is effective for obtaining a thin thermistor sintered body 10.

After repeating step 1A (dropping raw material) and step 2A (spin coating) 20 times (20 cycles), the sintering is performed. Except for this procedure, the manufacturing procedures of the first embodiment were followed.

Figure 18A:
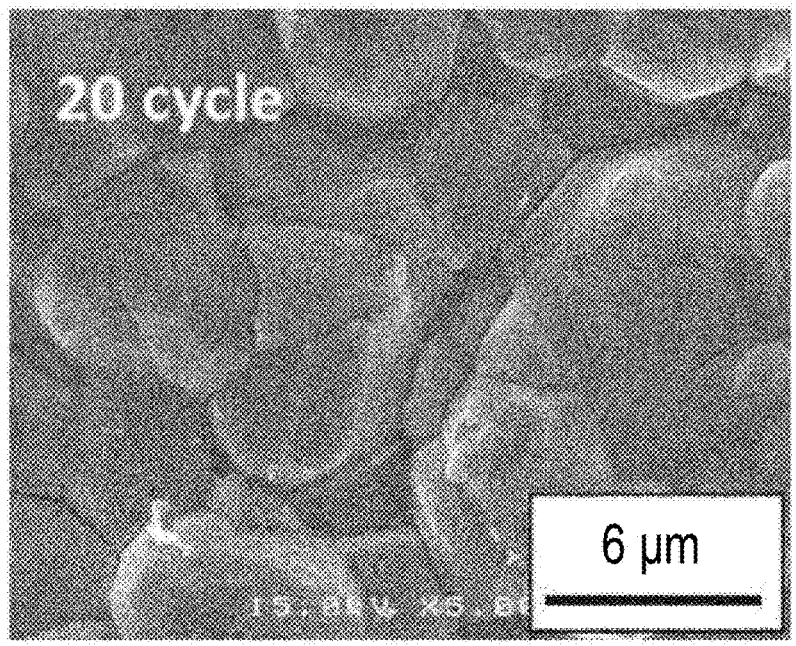
FIGS. 18A and 18B show results of observing a thermistor sintered body obtained by a modification procedure of the first embodiment with a scanning electron microscope (5000 times), where
Figure 18B:
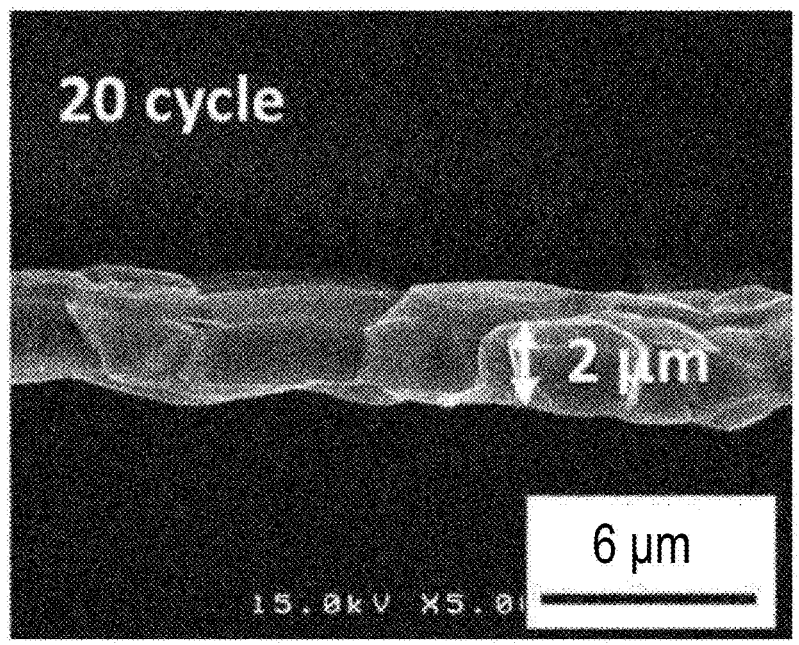

SEM images of the obtained sintered body are shown in FIGS. 18A and 18B. An extremely thin sintered body having a thickness of 2 μm was obtained. This sintered body has a negative temperature characteristic and satisfies requirements as an NTC thermistor.

REFERENCE SIGNS LIST

RL Raw material liquid
10 Thermistor sintered body
20 Substrate
30 Thermistor joined body
40 Thermistor divided body
MG Magnet

The invention claimed is:

1. A thermistor sintered body, wherein the thermistor sintered body has a thickness in a range of 1 μm to 100 μm and an area in a range of 1 mm² to 10 mm², and the thermistor sintered body is composed of a single body of a sintered body having a composition of $NiMn_2O_4$, wherein in the thermistor sintered body, 40% to 80% of Mn in the $NiMn_2O_4$ is substituted with Fe, and the thermistor sintered body has a relative density of 90% or more.

2. The thermistor sintered body according to claim 1, wherein:
the thickness is in a range of 10 μm to 50 μm; and
the area is in a range of 2 mm² to 5 mm².

3. A manufacturing method of a thermistor sintered body according to claim 1, the manufacturing method comprising:
a first step of dropping a raw material liquid onto a surface of a rotatably supported substrate;
a second step of rotating the substrate with the dropped raw material liquid and spreading the raw material liquid;
a third step of forming the sintered body having the composition of $NiMn_2O_4$ on the surface of the substrate by heating and holding the raw material liquid and the substrate on which the raw material liquid has been placed;
and a fourth step of separating the sintered body from the substrate.

4. The manufacturing method of the thermistor sintered body according to claim 3, wherein the third step is performed after repeating the first step and the second step a plurality of times.

5. The manufacturing method of the thermistor sintered body according to claim 3, wherein in the fourth step, the sintered body is separated from the substrate based on a difference in linear expansion coefficient between the sintered body and the substrate.

6. The manufacturing method of the thermistor sintered body according to claim 3, wherein in the fourth step, the sintered body is separated from the substrate by selectively dissolving the substrate.

7. The manufacturing method of the thermistor sintered body according to claim 3, wherein a thermistor joined body, in which the sintered body is formed on the surface of the substrate, is cut and divided in a grid pattern when viewed from above in order to generate a plurality of thermistor divided bodies; and wherein the sintered body is separated from the substrate by selectively dissolving a boundary portion in each of the plurality of generated thermistor divided bodies, the boundary portion being located between the sintered body and the substrate.

8. The manufacturing method of the thermistor sintered body according to claim 5, wherein a trace of a material forming the substrate remains on a separation surface, which is a surface of the sintered body from which the substrate is separated.

9. The manufacturing method of the thermistor sintered body according to claim 3 further comprising:

recovering the sintered body separated from the substrate by magnetic force.

10. The thermistor sintered body according to claim 2, wherein 20% to 90% of Mn in the $NiMn_2O_4$ is substituted with Fe.

11. A manufacturing method of a thermistor sintered body according to claim 2, the manufacturing method comprising:

a first step of dropping a raw material liquid onto a surface of a rotatably supported substrate;

a second step of rotating the substrate with the dropped raw material liquid and spreading the raw material liquid;

a third step of forming the sintered body having the composition of $NiMn_2O_4$ on the surface of the substrate by heating and holding the raw material liquid and the substrate on which the raw material liquid has been placed; and a fourth step of separating the sintered body from the substrate.

12. The manufacturing method of the thermistor sintered body according to claim 4, wherein in the fourth step, the sintered body is separated from the substrate based on a difference in linear expansion coefficient between the sintered body and the substrate.

13. The manufacturing method of the thermistor sintered body according to claim 4, wherein in the fourth step, the sintered body is separated from the substrate by selectively dissolving the substrate.

14. The manufacturing method of the thermistor sintered body according to claim 4, wherein a thermistor joined body, in which the sintered body is formed on the surface of the substrate, is cut and divided in a grid pattern when viewed from above in order to generate a plurality of thermistor divided bodies; and wherein the sintered body is separated from the substrate by selectively dissolving a boundary portion in each of the plurality of generated thermistor divided bodies, the boundary portion being located between the sintered body and the substrate.

15. The manufacturing method of the thermistor sintered body according to claim 6, wherein a trace of a material forming the substrate remains on a separation surface, which is a surface of the sintered body from which the substrate is separated.

16. The manufacturing method of the thermistor sintered body according to claim 7, wherein a trace of a material forming the substrate remains on a separation surface, which is a surface of the sintered body from which the substrate is separated.

17. The manufacturing method of the thermistor sintered body according to claim 5 further comprising recovering the sintered body separated from the substrate by magnetic force.

18. The manufacturing method of the thermistor sintered body according to claim 6 further comprising recovering the sintered body separated from the substrate by magnetic force.

* * * * *